US 008787465 B2

(12) United States Patent
Chiu et al.

(10) Patent No.: US 8,787,465 B2
(45) Date of Patent: Jul. 22, 2014

(54) METHOD FOR NEIGHBORING BLOCK DATA MANAGEMENT OF ADVANCED VIDEO DECODER

(75) Inventors: Yi-Jen Chiu, San Jose, CA (US); Prasanna Singamsetty, San Jose, CA (US); Munsi Haque, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 2160 days.

(21) Appl. No.: 11/396,102

(22) Filed: Mar. 31, 2006

(65) Prior Publication Data

US 2007/0230582 A1 Oct. 4, 2007

(51) Int. Cl.
*H04N 7/12* (2006.01)

(52) U.S. Cl.
USPC .............................. 375/240.26; 375/240.27

(58) Field of Classification Search
USPC ...................................... 375/240.26, 240.27
See application file for complete search history.

(56) References Cited

U.S. PATENT DOCUMENTS

| 6,088,047 A * | 7/2000 | Bose et al. ..................... 345/547 |
| 6,519,287 B1 * | 2/2003 | Hawkins et al. ......... 375/240.16 |
| 7,245,242 B2 * | 7/2007 | Hu et al. ........................ 341/107 |
| 7,469,070 B2 * | 12/2008 | Winger ......................... 382/239 |
| 7,864,864 B2 * | 1/2011 | Mehta et al. ............. 375/240.24 |
| 2004/0233990 A1 * | 11/2004 | Sekiguchi et al. ....... 375/240.16 |
| 2006/0023792 A1 * | 2/2006 | Cho et al. ................. 375/240.24 |
| 2006/0098734 A1 * | 5/2006 | Cho et al. ................. 375/240.03 |
| 2006/0262958 A1 * | 11/2006 | Yin et al. ..................... 382/103 |

* cited by examiner

*Primary Examiner* — Anner Holder
(74) *Attorney, Agent, or Firm* — Kacvinsky Daisak Bluni PLLC

(57) ABSTRACT

An embodiment improves the operation of a H.264 and Joint Scalable Video Codec (e.g., JSVC/H.264 Amendment 3) video decoder by managing neighboring block data during the decoding process. An embodiment pre-computes neighboring block tables to efficiently locate the neighboring block data required to decode a current macroblock. In particular, the pre-computed most probable joint neighboring block tables disclosed herein handle both macroblock adaptive frame field (MBAFF) coding and non-MBAFF coding. An embodiment is further capable of managing variable block sizes. Other embodiments are described and claimed.

20 Claims, 7 Drawing Sheets

| mbAddrD 450 | mbAddrB 430 | mbAddrC 440 |
|---|---|---|
| mbAddrA 420 | CurrMbAddr 410 | |
| | | |

| mbAddrD (Top) 545 | mbAddrB (Top) 525 | mbAddrC (Top) 535 |
|---|---|---|
| mbAddrD (Bottom) 550 | mbAddrB (Bottom) 530 | mbAddrC (Bottom) 540 |
| mbAddrA (Top) 515 | CurrMbAddr (Top) 505 | |
| mbAddrA (Bottom) 520 | CurrMbAddr (Bottom) 510 | |

| | | |
|---|---|---|
| mbAddrD | mbAddrB | mbAddrC |

| 16 | 18 | 19 | 20 | 21 | 26 |

| 17 | 22 | 23 | 24 | 25 | 27 |

| mbAddrA | 28 | 0  | 1  | 4  | 5  |
|         | 29 | 2  | 3  | 6  | 7  |
|         | 30 | 8  | 9  | 12 | 13 |
|         | 31 | 10 | 11 | 14 | 15 |
|         | 32 | 0B | 1B | 4B | 5B |
|         | 33 | 2B | 3B | 6B | 7B |
|         | 34 | 8B | 9B | 12B| 13 |
|         | 35 | 10B| 11B| 14B| 15B|

0-15  current MB Top 0B-15B: current MB Bottom 16-17: Neighbor MB D 18-25: Neighbor MB B 26-27: Neighbor MB C 28-35: Neighbor MB A

|  | mbAddrD | | mbAddrB | | | mbAddrC | |
|---|---|---|---|---|---|---|---|
|  |  | 17 | 22 | 23 | 24 | 25 | 27 |
| mbAddrA | 28 | 0 | 1 | 4 | 5 |
|  | 29 | 2 | 3 | 6 | 7 |
|  | 30 | 8 | 9 | 12 | 13 |
|  | 31 | 10 | 11 | 14 | 15 |

0-15 current MB 28-31: Neighbor MB A 22-25: Neighbor MB B

27: Neighbor MB C

17: Neighbor MB D

700

METHOD FOR NEIGHBORING BLOCK DATA MANAGEMENT OF ADVANCED VIDEO DECODER

BACKGROUND

The latest international video coding standard is the H.264/MPEG-4 Advanced Video Coding (AVC) standard jointly developed and promulgated by the Video Coding Experts Group of the International Telecommunications Union (ITU) and the Motion Picture Experts Group (MPEG) of the International Organization for Standardization and the International Electrotechnical Commission. The AVC H.264/MPEG-4 AVC standard provides coding for a wide variety of applications including video telephony, video conferencing, television, streaming video, digital video authoring, and other video applications. The standard further provides coding for storage applications for the above noted video applications including hard disk and DVD storage.

BRIEF DESCRIPTION OF THE DRAWINGS

FIG. 4 illustrates neighboring macroblocks for a current macroblock in a non macroblock adaptive frame field (MBAFF) coding mode.

FIG. 5 illustrates neighboring macroblocks for a current macroblock in an MBAFF coding mode.

FIG. 6 illustrates neighbor block locations of 4×4 blocks required to decode a current macroblock for MBAFF coding mode.

FIG. 7 illustrates neighbor block locations of 4×4 blocks required to decode a current macroblock for non-MBAFF coding mode.

DETAILED DESCRIPTION

Figure 1:
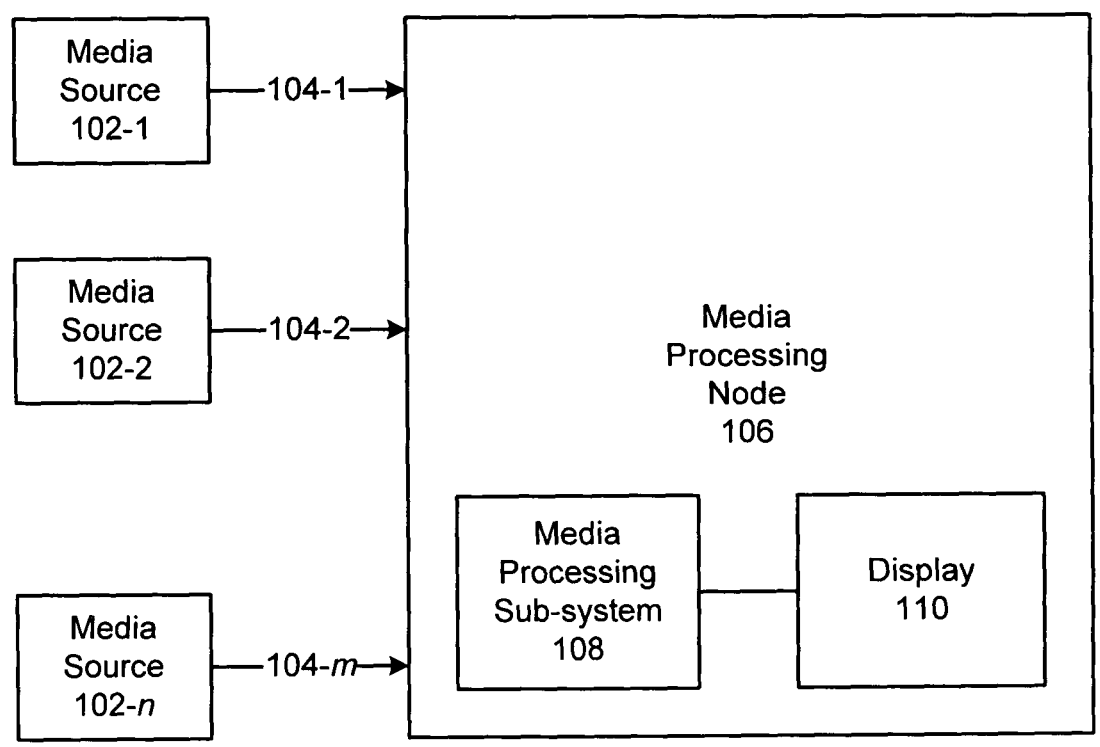
FIG. 1 illustrates an embodiment of a media processing system.

Embodiments of a method for neighboring block data management for an advanced video decoder will be described. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as defined by the accompanying claims.

Various embodiments may be used to improve the operation of an H.264 and Joint Scalable Video Codec (e.g., JSVC/H.264 Amendment 3) video decoder by managing neighboring block data during the decoding process. An embodiment pre-computes neighboring block tables to efficiently locate the neighboring block data required to decode a current macroblock. In particular, the pre-computed most probable joint neighboring block tables disclosed herein handle both macroblock adaptive frame field (MBAFF) coding and non-MBAFF coding. An embodiment is further capable of managing variable block sizes.

FIG. 1 illustrates one embodiment of a system. FIG. 1 illustrates a block diagram of a system 100. In one embodiment, for example, system 100 may comprise a media processing system having multiple nodes. A node may comprise any physical or logical entity for processing and/or communicating information in the system 100 and may be implemented as hardware, software, or any combination thereof, as desired for a given set of design parameters or performance constraints. Although FIG. 1 is shown with a limited number of nodes in a certain topology, it may be appreciated that system 100 may include more or less nodes in any type of topology as desired for a given implementation. The embodiments are not limited in this context.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

In various embodiments, the communications system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television System Committee (NTSC) standard, the Phase Alteration by Line (PAL) standard, the MPEG-1 standard, the MPEG-2 standard, the MPEG-4 standard, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, and so forth. The embodiments are not limited in this context.

In various embodiments, the nodes of system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a node to process the media information in a predetermined manner, and so forth. The embodiments are not limited in this context.

In various embodiments, system 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media. An example of wireless communication media may include portions of a wireless spectrum, such as the RF spectrum in general, and the ultra-high frequency (UHF) spectrum in particular. The wireless nodes may include components and interfaces suitable for communicating information signals over the designated wireless spectrum, such as one or more antennas, wireless transmitters/receivers ("transceivers"), amplifiers, filters, control logic, antennas, and so forth. The embodiments are not limited in this context.

In various embodiments, system 100 may comprise a media processing system having one or more media source nodes 102-1-n. Media source nodes 102-1-n may comprise any media source capable of sourcing or delivering media information and/or control information to media processing node 106. More particularly, media source nodes 102-1-n may comprise any media source capable of sourcing or delivering digital audio and/or video (AV) signals to media processing node 106. Examples of media source nodes 102-1-n may include any hardware or software element capable of storing and/or delivering media information, such as a Digital Versatile Disk (DVD) device, a Video Home System (VHS) device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, and so forth.

Other examples of media source nodes 102-1-n may include media distribution systems to provide broadcast or streaming analog or digital AV signals to media processing node 106. Examples of media distribution systems may include, for example, Over The Air (OTA) broadcast systems, terrestrial cable systems (CATV), satellite broadcast systems, and so forth. It is worthy to note that media source nodes 102-1-n may be internal or external to media processing node 106, depending upon a given implementation. The embodiments are not limited in this context.

In various embodiments, the incoming video signals received from media source nodes 102-1-n may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context.

In various embodiments, media processing system 100 may comprise a media processing node 106 to connect to media source nodes 102-1-n over one or more communications media 104-1-m. Media processing node 106 may comprise any node as previously described that is arranged to process media information received from media source nodes 102-1-n. In various embodiments, media processing node 106 may comprise, or be implemented as, one or more media processing devices having a processing system, a processing sub-system, a processor, a computer, a device, an encoder, a decoder, a coder/decoder (CODEC), a filtering device (e.g., graphic scaling device, deblocking filtering device), a transformation device, an entertainment system, a display, or any other processing architecture. The embodiments are not limited in this context.

In various embodiments, media processing node 106 may include a media processing sub-system 108. Media processing sub-system 108 may comprise a processor, memory, and application hardware and/or software arranged to process media information received from media source nodes 102-1-n. For example, media processing sub-system 108 may be arranged to manage neighboring block data of, for example, a JSVC/H.264 video decoder for an image or picture and perform other media processing operations as described in more detail below. Media processing sub-system 108 may output the processed media information to a display 110. The embodiments are not limited in this context.

In various embodiments, media processing node 106 may include a display 110. Display 110 may be any display capable of displaying media information received from media source nodes 102-1-n. Display 110 may display the media information at a given format resolution. For example, display 110 may display the media information on a display having a VGA format resolution, XGA format resolution, SXGA format resolution, UXGA format resolution, and so forth. The type of displays and format resolutions may vary in accordance with a given set of design or performance constraints, and the embodiments are not limited in this context.

In general operation, media processing node 106 may receive media information from one or more of media source nodes 102-1-n. For example, media processing node 106 may receive media information from a media source node 102-1 implemented as a DVD player integrated with media processing node 106. Media processing sub-system 108 may retrieve the media information from the DVD player, convert the media information from the visual resolution format to the display resolution format of display 110, and reproduce the media information using display 110.

In various embodiments, media processing node 106 may be arranged to receive an input image from one or more of media source nodes 102-1-n. The input image may comprise any data or media information derived from or associated with one or more video images. In various embodiments, the input image may comprise one or more of image data, video data, video sequences, groups of pictures, pictures, images, regions, objects, frames, slices, macroblocks, blocks, pixels, signals, and so forth. The values assigned to pixels may comprise real numbers and/or integer numbers.

In various embodiments, media processing node 106 may be arranged to manage neighboring block data of, for example, a JSVC/H.264 video decoder for an image or picture. For example, the media processing node 106 may decode a current macroblock according to the H.264 standard. More specifically, the media processing node 106 may calculate the addresses of the macroblocks neighboring the current macroblock and retrieve the properties of the neighboring macroblock based on the addresses. Based on the spatial correlation between the current macroblock and the neighboring macroblocks, the media processing node 106 may utilize data related to previously decoded neighboring macroblocks to decode the current macroblock. Further, the media processing node 106 of an embodiment may reference pre-computed tables containing data related to the neighboring macroblocks to decode the current macroblock. In an embodiment, the tables may further account for the unavailability of one or more neighboring macroblocks depending on the location of the current macroblock within the picture and whether or not the neighboring macroblock(s) are of the same type as the current macroblock to be decoded by media processing node 106.

In one embodiment, for example, media processing sub-system 108 of media processing node 106 may be arranged to decode a current macroblock of a frame or picture based in part on the properties of previously decoded neighboring macroblocks. More specifically, the media-processing sub-system 108 may associate the motion vector, intra prediction, content adaptive binary arithmetic coding (CABAC) and macroblock properties of the previously decoded neighboring macroblocks to determine the related properties of the current macroblocks. For some current macroblocks (e.g., based on their location within an image or picture) one or more neighboring macroblocks may be unavailable. Depending on the availability of all or some of the neighboring macroblocks as well as the type of macroblock (e.g., the type of the neighboring macroblock(s) versus the type of the current macroblock), the media processing node may retrieve neighboring macroblock data from, for example, tables containing the requested neighboring macroblock data. Media processing sub-system 108 may utilize one or more predefined or predetermined mathematical functions or pre-computed tables to control the processing and output (e.g., to the display 110) of a decoded frame or frames to improve system 100 performance. System 100 in general, and media processing sub-system 108 in particular, may be described in more detail with reference to FIG. 2.

Figure 2:
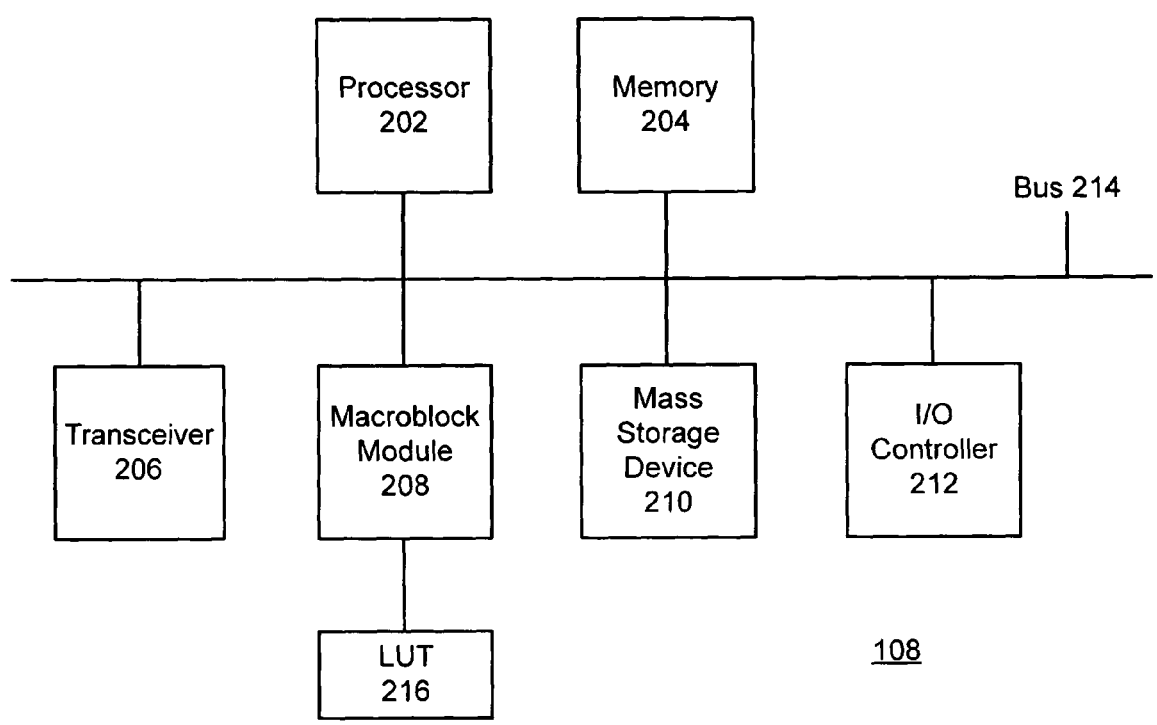
FIG. 2 illustrates an embodiment of a media processing sub-system.

FIG. 2 illustrates one embodiment of a media processing sub-system 108. FIG. 2 illustrates a block diagram of a media processing sub-system 108 suitable for use with media processing node 106 as described with reference to FIG. 1. The embodiments are not limited, however, to the example given in FIG. 2.

As shown in FIG. 2, media processing sub-system 108 may comprise multiple elements. One or more elements may be implemented using one or more circuits, components, registers, processors, software subroutines, modules, or any combination thereof, as desired for a given set of design or performance constraints. Although FIG. 2 shows a limited number of elements in a certain topology by way of example, it can be appreciated that more or less elements in any suitable topology may be used in media processing sub-system 108 as desired for a given implementation. The embodiments are not limited in this context.

In various embodiments, media processing sub-system 108 may include a processor 202. Processor 202 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation, Santa Clara, Calif. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

In one embodiment, media processing sub-system 108 may include a memory 204 to couple to processor 202. Memory 204 may be coupled to processor 202 via communications bus 214, or by a dedicated communications bus between processor 202 and memory 204, as desired for a given implementation. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 204 may be included on the same integrated circuit as processor 202, or alternatively some portion or all of memory 204 may be disposed on an integrated circuit or other medium, for example a hard disk drive, that is external to the integrated circuit of processor 202. The embodiments are not limited in this context.

In various embodiments, media processing sub-system 108 may include a transceiver 206. Transceiver 206 may be any radio transmitter and/or receiver arranged to operate in accordance with a desired wireless protocols. Examples of suitable wireless protocols may include various wireless local area network (WLAN) protocols, including the IEEE 802.xx series of protocols, such as IEEE 802.11a/b/g/n, IEEE 802.16, IEEE 802.20, and so forth. Other examples of wireless protocols may include various wireless wide area network (WWAN) protocols, such as Global System for Mobile Communications (GSM) cellular radiotelephone system protocols with General Packet Radio Service (GPRS), Code Division Multiple Access (CDMA) cellular radiotelephone communication systems with 1×RTT, Enhanced Data Rates for Global Evolution (EDGE) systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles (collectively referred to herein as "Bluetooth Specification"), and so forth. Other suitable protocols may include Ultra Wide Band (UWB), Digital Office (DO), Digital Home, Trusted Platform Module (TPM), ZigBee, and other protocols. The embodiments are not limited in this context.

In various embodiments, media processing sub-system 108 may include one or more modules. The modules may comprise, or be implemented as, one or more systems, sub-systems, processors, devices, machines, tools, components, circuits, registers, applications, programs, subroutines, or any combination thereof, as desired for a given set of design or performance constraints. The embodiments are not limited in this context.

In one embodiment, for example, media processing sub-system 108 may include a macroblock module 208. The macroblock module may decode a current macroblock based in part on information from previously decoded neighboring macroblocks as introduced above according to predetermined mathematical functions, algorithms, or tables. For example, the predetermined mathematical functions, algorithms, or tables may be stored in any suitable storage device, such as memory 204, a mass storage device (MSD) 210, a hardware-implemented lookup table (LUT) 216, and so forth. It may be appreciated that macroblock module 208 may be implemented as software executed by processor 202, dedicated hardware, or a combination of both. The embodiments are not limited in this context.

In various embodiments, media processing sub-system 108 may include a MSD 210. Examples of MSD 210 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, media processing sub-system 108 may include one or more I/O adapters 212. Examples of I/O adapters 212 may include Universal Serial Bus (USB) ports/adapters, IEEE 1394 Firewire ports/adapters, and so forth. The embodiments are not limited in this context.

In general operation, media processing sub-system 108 may receive media information from one or more media source nodes 102-1-n. For example, media source node 102-1 may comprise a DVD device connected to processor 202. Alternatively, media source 102-2 may comprise memory 204 storing a digital AV file, such as a motion pictures expert group (MPEG) encoded AV file. The macroblock module 208 may operate to receive the media information from mass storage device 216 and/or memory 204, process the media information (e.g., via processor 202), and store or buffer the media information on memory 204, the cache memory of processor 202, or a combination thereof. The operation of the macroblock module 208 may be understood with reference to FIG. 3 through FIG. 8.

Figure 3:
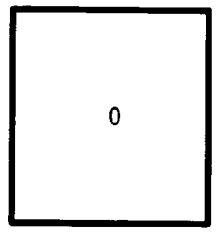
FIG. 3 illustrates block patterns of a macroblock.
Figure 3:
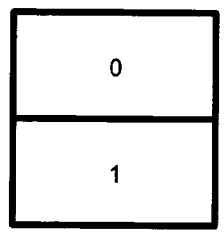
Figure 3:
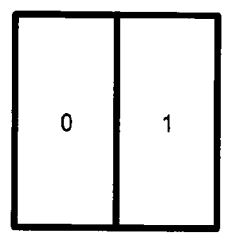
Figure 3:
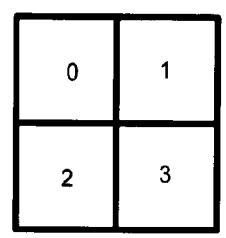

Recent video codec standards such as H.264, JSVC (e.g., H.264 Amendment 3), VC1, China AVS and the legacy video codec standards such as MPEG-4 Part 2 Version 1, Version 2 of the same, MPEG-2, MPEG-1, H.263, and H.261 are block-based coding techniques that utilize transform coding and entropy coding on the residue of the motion compensated block to process the block. A macroblock (MB) consists of 16×16 luma pixels that represent a portion of a video frame or picture and may serve as the basic unit of process for a video codec standard. According to some standards, as illustrated by FIG. 1, a MB may further be partitioned into 16×8, 8×16, and 8×8 blocks. Each 8×8 block, called a sub-macroblock or SubMB, may be further divided into smaller blocks such as 8×4, 4×8, and 4×4 according to the H.264 standard and as also illustrated by FIG. 3.

The video codec standards noted above, and in particular H.264 and JSVC, may utilize information related to previously decoded neighboring blocks to decode a current MB based on spatial correlation between blocks to achieve higher coding efficiency. Specifically, the reconstruction of motion vector, intra prediction, content adaptive binary arithmetic coding (CABAC), and other MB properties of the current MB may utilize the associated information from the previously reconstructed adjacent MBs. The location of neighboring MBs is illustrated by FIG. 4 and FIG. 5. FIG. 4 illustrates a non-macroblock adaptive frame field (non-MBAFF) structure. The current MB 410 has neighboring MBs MB A 420, MB B 430, MB C 440, and MB D 450. FIG. 5 illustrates a current MB according to H.264 for which the neighboring configuration becomes more complex given H.264's MBAFF coding structure. MBAFF requires coding in an MB pair. For example, the current MB comprises a top 505 and a bottom 510. Adjacent to the current MB is MB A top 515 and bottom 520, MB B top 525 and bottom 530, MB C top 535 and bottom 540, and MB D top 545 and bottom 550. MBAFF coding, among other features, may alter the frame/field coding at an MB pair level, and may result in different frame/field coding modes for adjacent MBs. Further, there potentially may be a significant number of blocks in an MB, each of which may require the location of its neighboring blocks. As a result, the operation of locating neighboring blocks for every coded block inside an MB according to H.264 (e.g., including an MBAFF structure) may become substantially computationally costly.

An embodiment is a method of locating a current MB's neighboring blocks at least in part by pre-computing tables of probable neighboring block locations for all possible current MB and neighbor MB configurations. An embodiment may further process a current MB that has a variable block size as noted with respect to FIG. 3. In an embodiment, the parameters such as motion vectors and intra prediction mode may be stored at the MB level, 16×8, 8×16, 8×8, 8×4, 4×8, or the 4×4 block level. The method of an embodiment may occur at the MB level to access the neighboring MBs based on the locations specified in, for example, tables containing neighboring MB information. The tables containing neighboring MB information, as will be explained more fully below, may be derived based on statistical relationship of frame/field type between a current MB and previously decoded neighboring MBs. The method of an embodiment may improve the current MB decoding speed by reducing the complexity of the video decoder as the video decoder may refer to a pre-calculated table versus calculating the neighboring MB location dynamically.

For the following neighboring block tables of an embodiment and description thereof, various parameters may be stored at the MB level, 16×8, 8×16, 8×8, 8×4, 4×8, or the 4×4 block level. For example, the MB level may contain: frame_MB or field_MB, top/bottom MB or top_field/bottom_field MB, MB_num, and Slice_num. The 4×4 level may contain motion vector information mvL0/mvL1, reference index information refIdxL0/refIdxL1, prediction flag information predFlagL0/predFlagL1, and an indication of intra prediction mode intrapred.

FIG. 6 illustrates the locations of a current MB and the 4×4 blocks of the method of an embodiment. In an embodiment, the location of the neighboring block may be derived according to the pattern of the 4×4 blocks to achieve reduced storage. For every neighboring MB pair, the top location of the MB pair will store the data of the top frame MB if the MB pair is encoded in frame_mb mode and will store the data of the top field MB if the MB pair is encoded in field_mb mode. Alternatively, the bottom location of the MB pair will store the data of bottom frame MB if the MB pair is encoded in frame_mb mode and will store the data of the bottom field MB if the MB pair is encoded in field_mb mode. As illustrated by FIG. 6, indices may be used to indicate locations for the current MB and neighboring MBs. For example, the indices 0-15 may represent the 4×4 block in top of the current MB (e.g., current MB top 505), the indices 0B-15B may represent the 4×4 block in the bottom of the current MB (e.g., current MB bottom 510). Indices 16-35 may represent the 4×4 block from neighboring MBs. For example, indices 16 and 17 may represent neighbor MB D, 18-25 may represent neighbor MB B, 26 and 27 may represent neighbor MB C, and 28-35 may represent neighbor MB A. The indices may thereafter be used as part of the tables of an embodiment to reference locations of current and neighboring MBs as will be more fully explained below.

In general, the tables of an embodiment represent the spatial relationship between a current macroblock and neighbor macroblocks for both MBAFF coding and non-MBAFF coding schemes. Further, the tables of an embodiment account for the fact that neighboring MBs may not be available for all current MBs based on the location of the current MB (e.g., at a frame or picture border) of that the current MB and a neighboring MB may belong to a different slice. For example, for a current MB with address currMBAddr, an embodiment first derives current MB properties such as MB_type, Sub-MB_type, frame_mb/field_mb, and top/bottom. Thereafter, an embodiment derives the address of neighboring MBs (A/B/C/D) to locate and retrieve the properties of neighboring MBs by the following formulas for the two cases of non-MBAFF and MBAFF:

neighbor_MB_address(non-*MBAFF*)

$$\begin{cases} mbAddrA = CurrMBAddr - 1 \\ mbAddrB = CurrMBAddr - PicWidthInMbs \\ mbAddrC = CurrMbAddr - PicWidthInMbs + 1 \\ mbAddrD = CurrMbAddr - PicWidthInMbs - 1 \end{cases}$$

neighbor_MB_address(*MBAFF*)

$$\begin{cases} mbAddrA = 2*(CurrMBAddr/2 - 1) \\ mbAddrB = 2*(CurrMBAddr/2 - PicWidthInMbs) \\ mbAddrC = 2*(CurrMbAddr/2 - PicWidthInMbs + 1) \\ mbAddrD = 2*(CurrMbAddr/2 - PicWidthInMbs - 1) \end{cases}$$

As noted, there are two scenarios for which a neighboring MB may be unavailable for a particular current MB (e.g., current MB and neighboring MB belong to a different slice and the current MB located at the frame or picture border). The first scenario may be examined by comparing the slice_num of the stored neighboring MB to the slice_num of the current MB. If slice numbers are different, the current MB and the neighbor MB belong to different slices and that neighboring MB should be marked as unavailable accordingly The second scenario exists for non-MBAFF and MBAFF when the current MB is at the frame or picture border. Whether or not a particular current MB may have an unavailable neighbor may me determined by the following equations. For example, neighbor MB A and neighbor MB D are unavailable if the current MB is on the left picture border. Neighbor MB B is unavailable if the current MB is at the top picture border. Neighbor MB C is unavailable if the current MB is on the right picture border.

Unavailability(non-*MBAFF*)

$$\begin{cases} mbAddrA: \text{If } (CurrMBAddr \ \% \ PicWidthInMbs) == 0 \\ mbAddrB: \text{If } (CurrMBAddr < PicWidthInMbs) == 1 \\ mbAddrC: \text{If } ((CurrMbAddr + 1) \ \% \ PicWidthInMbs) == 0 \\ mbAddrD: \text{If } (CurrMbAddr \ \% \ PicWidthInMbs) == 0 \end{cases}$$

Unavailability(*MBAFF*)

$$\begin{cases} mbAddrA: \text{If } ((CurrMBAddr/2) \ \% \ PicWidthInMbs) == 0 \\ mbAddrB: \text{If } ((CurrMBAddr/2) < PicWidthInMbs) == 1 \\ mbAddrC: \text{If } ((CurrMbAddr/2 + 1) \ \% \ PicWidthInMbs) == 0 \\ mbAddrD: \text{If } ((CurrMbAddr/2) \ \% \ PicWidthInMbs) == 0 \end{cases}$$

As will be illustrated by the following tables, when neighbor MBs are not available based on the conditions noted above, the table of an embodiment will include null or "not available" entry for that particular neighbor MB. More specifically, when neighbor MB A is not available, the value of indices 28-35 (e.g., as illustrated by FIG. 6) will be replaced as not available (N/A). When neighbor MB B is not available, the value of indices 18-25 will be replaced as not available (N/A). When neighbor MB C is not available, the value of indices 26-27 may be replaced as the value 16 or 17 based on the property of neighbor MB D and of the current MB as expressed by the following equation given the neighboring MB D is available:

$$\begin{cases} \text{Neighbor\_blockC} = 17: & \text{If } (CurrMB == \text{Top\_FrameMB}) \\ \text{Neighbor\_blockC} = 17: & \text{If } (CurrMB == \text{Bottom\_FieldMB}) \\ \text{Neighbor\_blockC} = 17: & \text{If } (CurrMB == \text{Top\_FieldMB}) \&\& (\text{NeighborMB\_D} == FrameMB) \\ \text{Neighbor\_blockC} = 16: & \text{If } ((CurrMB == \text{Top\_FieldMB}) \&\& (\text{NeighborMB\_D} == \text{Field\_MB})) \end{cases}$$

Table 1 through Table 3 illustrate the location of neighbor MBs A, B, C respectively for a current MB when the corresponding neighbor MBs A, B, and C are available according to MBAFF coding. The first column indicates the block (BLK) type of the target block. For example, the block type may be 16×16, 16×8, 8×16, 8×8, 8×4, 4×8 and 4×4 according to the derived syntax elements MB_type and SubMB_type from the bitstreams. The second column indicates the block index (BLK IDX) of the target block as illustrated by the various block configurations as illustrated by FIG. 3. The third and subsequent columns show the location block index of the neighboring block for the target block based on the property of frame_MB (FRM), field_MB (FLD), top (T), and bottom (B) of the current MB (Cur) and of the neighboring MBs (Neighbor A (NA), Neighbor B (NB), Neighbor C (NC), Neighbor D (ND) respectively). Of further note is that Table 3 includes the effect of replacing the neighbor block C with neighbor block D when the desired neighbor block C is not available due to the late occurrence of neighbor block C in decoding order.

TABLE 1

The neighboring block A table when the neighboring MB A is available

| BLK Type | BLK IDX | [Cur(T, FRM) && NA(FRM)] OR [Cur(T, FLD) && NA(FLD)] | [Cur(B, FRM) && NA(FRM)] OR [Cur(B, FLD) && NA(FLD)] | Cur(T, FRM) && NA(FLD) | Cur(B, FRM) && NA(FLD) | Cur(T, FLD) && NA(FRM) | Cur(B, FLD) && NA(FRM) |
|---|---|---|---|---|---|---|---|
| 16 × 16 | 0 | 28 | 32 | 28 | 30 | 28 | 28 |
| 16 × 8 | 0 | 28 | 32 | 28 | 30 | 28 | 28 |
| 16 × 8 | 1 | 30 | 34 | 29 | 31 | 32 | 32 |
| 8 × 16 | 0 | 28 | 32 | 28 | 30 | 28 | 28 |
| 8 × 16 | 1 | 1 | 1B | 1 | 1B | 1 | 1B |
| 8 × 8 | 0 | 28 | 32 | 28 | 30 | 28 | 28 |
| 8 × 8 | 1 | 1 | 1B | 1 | 1B | 1 | 1B |
| 8 × 8 | 2 | 30 | 34 | 29 | 31 | 32 | 32 |
| 8 × 8 | 3 | 9 | 9B | 9 | 9B | 9 | 9B |
| 8 × 4 | 0 | 28 | 32 | 28 | 30 | 28 | 28 |
| 8 × 4 | 1 | 29 | 33 | 28 | 30 | 30 | 30 |
| 8 × 4 | 2 | 1 | 1B | 1 | 1B | 1 | 1B |
| 8 × 4 | 3 | 3 | 3B | 3 | 3B | 3 | 3B |
| 8 × 4 | 4 | 30 | 34 | 29 | 31 | 32 | 32 |
| 8 × 4 | 5 | 31 | 35 | 29 | 31 | 34 | 34 |
| 8 × 4 | 6 | 9 | 9B | 9 | 9B | 9 | 9B |
| 8 × 4 | 7 | 11 | 11B | 11 | 11B | 11 | 11B |
| 4 × 8 | 0 | 28 | 32 | 28 | 30 | 28 | 28 |
| 4 × 8 | 1 | 0 | 0B | 0 | 0B | 0 | 0B |
| 4 × 8 | 2 | 1 | 1B | 1 | 1B | 1 | 1B |
| 4 × 8 | 3 | 4 | 4B | 4 | 4B | 4 | 4B |
| 4 × 8 | 4 | 30 | 34 | 29 | 31 | 32 | 32 |
| 4 × 8 | 5 | 8 | 8B | 8 | 8B | 8 | 8B |
| 4 × 8 | 6 | 9 | 9B | 9 | 9B | 9 | 9B |
| 4 × 8 | 7 | 12 | 12B | 12 | 12B | 12 | 12B |
| 4 × 4 | 0 | 28 | 32 | 28 | 30 | 28 | 28 |
| 4 × 4 | 1 | 0 | 0B | 0 | 0B | 0 | 0B |
| 4 × 4 | 2 | 29 | 33 | 28 | 30 | 30 | 30 |
| 4 × 4 | 3 | 2 | 2B | 2 | 2B | 2 | 2B |
| 4 × 4 | 4 | 1 | 1B | 1 | 1B | 1 | 1B |
| 4 × 4 | 5 | 4 | 4B | 4 | 4B | 4 | 4B |
| 4 × 4 | 6 | 3 | 3B | 3 | 3B | 3 | 3B |
| 4 × 4 | 7 | 6 | 6B | 6 | 6B | 6 | 6B |
| 4 × 4 | 8 | 30 | 34 | 29 | 31 | 32 | 33 |
| 4 × 4 | 9 | 8 | 8B | 8 | 8B | 8 | 8B |
| 4 × 4 | 10 | 31 | 35 | 29 | 31 | 34 | 34 |
| 4 × 4 | 11 | 10 | 10B | 10 | 10B | 10 | 10B |
| 4 × 4 | 12 | 9 | 9B | 9 | 9B | 9 | 9B |
| 4 × 4 | 13 | 12 | 12B | 12 | 12B | 12 | 12B |
| 4 × 4 | 14 | 11 | 11B | 11 | 11B | 11 | 11B |
| 4 × 4 | 15 | 14 | 14B | 14 | 14B | 14 | 14B |

TABLE 2

The neighboring block B table for the neighboring MB B is available

| BLK Type | BLK IDX | [Cur(T, FRM)] OR [Cur(T, FLD) && NB(FRM)] OR [Cur(B, FLD)] | Cur(B, FRM) | Cur(T, FLD) && NB(FLD) |
|---|---|---|---|---|
| 16 × 16 | 0 | 22 | 10 | 18 |
| 16 × 8 | 0 | 22 | 10 | 18 |
| 16 × 8 | 1 | 2 | 2B | 2 |
| 8 × 16 | 0 | 22 | 10 | 18 |
| 8 × 16 | 1 | 24 | 14 | 20 |
| 8 × 8 | 0 | 22 | 10 | 18 |
| 8 × 8 | 1 | 24 | 14 | 20 |
| 8 × 8 | 2 | 2 | 2B | 2 |
| 8 × 8 | 3 | 6 | 6B | 6 |
| 8 × 4 | 0 | 22 | 10 | 18 |
| 8 × 4 | 1 | 0 | 0B | 0 |
| 8 × 4 | 2 | 24 | 14 | 20 |
| 8 × 4 | 3 | 4 | 4B | 4 |
| 8 × 4 | 4 | 2 | 2B | 2 |
| 8 × 4 | 5 | 8 | 8B | 8 |
| 8 × 4 | 6 | 6 | 6B | 6 |
| 8 × 4 | 7 | 12 | 12B | 12 |
| 4 × 8 | 0 | 22 | 10 | 18 |
| 4 × 8 | 1 | 23 | 11 | 19 |
| 4 × 8 | 2 | 24 | 14 | 20 |
| 4 × 8 | 3 | 25 | 15 | 21 |
| 4 × 8 | 4 | 2 | 2B | 2 |
| 4 × 8 | 5 | 3 | 3B | 3 |
| 4 × 8 | 6 | 6 | 6B | 6 |
| 4 × 8 | 7 | 7 | 7B | 7 |
| 4 × 4 | 0 | 22 | 10 | 18 |
| 4 × 4 | 1 | 23 | 11 | 19 |
| 4 × 4 | 2 | 0 | 0B | 0 |
| 4 × 4 | 3 | 1 | 1B | 1 |
| 4 × 4 | 4 | 24 | 14 | 20 |
| 4 × 4 | 5 | 25 | 15 | 21 |
| 4 × 4 | 6 | 4 | 4B | 4 |
| 4 × 4 | 7 | 5 | 5B | 5 |
| 4 × 4 | 8 | 2 | 2B | 2 |
| 4 × 4 | 9 | 3 | 3B | 3 |
| 4 × 4 | 10 | 8 | 8B | 8 |
| 4 × 4 | 11 | 9 | 9B | 9 |
| 4 × 4 | 12 | 6 | 6B | 6 |
| 4 × 4 | 13 | 7 | 7B | 7 |
| 4 × 4 | 14 | 12 | 12B | 12 |
| 4 × 4 | 15 | 13 | 13B | 13 |

TABLE 3

The neighboring block C table when the neighboring MBs A, B, C are available

| BLK Type | BLK IDX | [Cur(T, FM) && NA(FM)] OR [Cur(T, FD) && NC(FM) && NB(FM) && NA(FD)] | Cur(T, FM) && NA(FD) | [Cur(T, FD) && NC(FM) && NB(FM) && NA(FM)] OR [Cur(B, FD) && NA(FM)] | Cur(B, FD) && NA(FD) | Cur(T, FD) && NC(FM) && NB(FD) | Cur(T, FD) && NC(FM) && NA(FM) |
|---|---|---|---|---|---|---|---|
| 16 × 16 | 0 | 27 | 27 | 27 | 27 | 27 | 27 |
| 16 × 8 | 0 | 27 | 27 | 27 | 27 | 27 | 27 |
| 16 × 8 | 1 | 29 | 32 | 31 | 33 | 29 | 31 |
| 8 × 16 | 0 | 24 | 24 | 24 | 24 | 20 | 20 |
| 8 × 16 | 1 | 27 | 27 | 27 | 27 | 27 | 27 |
| 8 × 8 | 0 | 24 | 24 | 24 | 24 | 20 | 20 |
| 8 × 8 | 1 | 27 | 27 | 27 | 27 | 27 | 27 |
| 8 × 8 | 2 | 6 | 6 | 6 | 6 | 6 | 6 |
| 8 × 8 | 3 | 3 | 3 | 3 | 3 | 3 | 3 |
| 8 × 4 | 0 | 24 | 24 | 24 | 24 | 20 | 20 |
| 8 × 4 | 1 | 28 | 32 | 29 | 32 | 28 | 29 |
| 8 × 4 | 2 | 27 | 27 | 27 | 27 | 27 | 27 |
| 8 × 4 | 3 | 1 | 1 | 1 | 1 | 1 | 1 |
| 8 × 4 | 4 | 6 | 6 | 6 | 6 | 6 | 6 |
| 8 × 4 | 5 | 30 | 33 | 33 | 34 | 30 | 33 |
| 8 × 4 | 6 | 3 | 3 | 3 | 3 | 3 | 3 |
| 8 × 4 | 7 | 9 | 9 | 9 | 9 | 9 | 9 |
| 4 × 8 | 0 | 23 | 23 | 23 | 23 | 19 | 19 |
| 4 × 8 | 1 | 24 | 24 | 24 | 24 | 20 | 20 |
| 4 × 8 | 2 | 25 | 25 | 25 | 25 | 21 | 21 |
| 4 × 8 | 3 | 27 | 27 | 27 | 27 | 27 | 27 |
| 4 × 8 | 4 | 3 | 3 | 3 | 3 | 3 | 3 |
| 4 × 8 | 5 | 6 | 6 | 6 | 6 | 6 | 6 |
| 4 × 8 | 6 | 7 | 7 | 7 | 7 | 7 | 7 |
| 4 × 8 | 7 | 6 | 6 | 6 | 6 | 6 | 6 |
| 4 × 4 | 0 | 23 | 23 | 23 | 23 | 19 | 19 |
| 4 × 4 | 1 | 24 | 24 | 24 | 24 | 20 | 20 |
| 4 × 4 | 2 | 1 | 1 | 1 | 1 | 1 | 1 |
| 4 × 4 | 3 | 0 | 0 | 0 | 0 | 0 | 0 |
| 4 × 4 | 4 | 25 | 25 | 25 | 25 | 21 | 21 |
| 4 × 4 | 5 | 27 | 27 | 27 | 27 | 27 | 27 |
| 4 × 4 | 6 | 5 | 5 | 5 | 5 | 5 | 5 |
| 4 × 4 | 7 | 4 | 4 | 4 | 4 | 4 | 4 |
| 4 × 4 | 8 | 3 | 3 | 3 | 3 | 3 | 3 |
| 4 × 4 | 9 | 6 | 6 | 6 | 6 | 6 | 6 |

TABLE 3-continued

The neighboring block C table when the neighboring MBs A, B, C are available

| | | | | | | | |
|---|---|---|---|---|---|---|---|
| 4 × 4 | 10 | 9 | 9 | 9 | 9 | 9 | 9 |
| 4 × 4 | 11 | 8 | 8 | 8 | 8 | 8 | 8 |
| 4 × 4 | 12 | 7 | 7 | 7 | 7 | 7 | 7 |
| 4 × 4 | 13 | 6 | 6 | 6 | 6 | 6 | 6 |
| 4 × 4 | 14 | 13 | 13 | 13 | 13 | 13 | 13 |
| 4 × 4 | 15 | 12 | 12 | 12 | 12 | 12 | 12 |

| BLK Type | BLK IDX | Cur(B, FM) && NA(FM) | Cur(B, FM) && NA(FD) | Cur(T, FD) && NC(FD) && NB(FD) && NA(FD) | Cur(T, FD) && NC(FD) && NB(FD) && NA(FM) | Cur(T, FD) && NC(FD) && NB(FM) && NA(FD) | Cur(T, FD) && NC(FD) && NB(FM) && NA(FM) |
|---|---|---|---|---|---|---|---|
| 16 × 16 | 0 | 31 | 33 | 26 | 26 | 26 | 26 |
| 16 × 8 | 0 | 31 | 33 | 26 | 26 | 26 | 26 |
| 16 × 8 | 1 | 33 | 34 | 29 | 31 | 29 | 31 |
| 8 × 16 | 0 | 14 | 14 | 20 | 20 | 24 | 24 |
| 8 × 16 | 1 | 31 | 33 | 26 | 26 | 26 | 26 |
| 8 × 8 | 0 | 14 | 14 | 20 | 20 | 24 | 24 |
| 8 × 8 | 1 | 11 | 11 | 26 | 26 | 26 | 26 |
| 8 × 8 | 2 | 6B | 6B | 6 | 6 | 6 | 6 |
| 8 × 8 | 3 | 3B | 3B | 3 | 3 | 3 | 3 |
| 8 × 4 | 0 | 14 | 14 | 20 | 20 | 24 | 24 |
| 8 × 4 | 1 | 32 | 34 | 28 | 29 | 28 | 29 |
| 8 × 4 | 2 | 11 | 11 | 26 | 26 | 26 | 26 |
| 8 × 4 | 3 | 1B | 1B | 1 | 1 | 1 | 1 |
| 8 × 4 | 4 | 6B | 6B | 6 | 6 | 6 | 6 |
| 8 × 4 | 5 | 34 | 35 | 30 | 33 | 30 | 33 |
| 8 × 4 | 6 | 3B | 3B | 3 | 3 | 3 | 3 |
| 8 × 4 | 7 | 9B | 9B | 9 | 9 | 9 | 9 |
| 4 × 8 | 0 | 11 | 11 | 19 | 19 | 23 | 23 |
| 4 × 8 | 1 | 14 | 14 | 20 | 20 | 24 | 24 |
| 4 × 8 | 2 | 15 | 15 | 21 | 21 | 25 | 25 |
| 4 × 8 | 3 | 14 | 14 | 26 | 26 | 26 | 26 |
| 4 × 8 | 4 | 3B | 3B | 3 | 3 | 3 | 3 |
| 4 × 8 | 5 | 6B | 6B | 6 | 6 | 6 | 6 |
| 4 × 8 | 6 | 7B | 7B | 7 | 7 | 7 | 7 |
| 4 × 8 | 7 | 6B | 6B | 6 | 6 | 6 | 6 |
| 4 × 4 | 0 | 11 | 11 | 19 | 19 | 23 | 23 |
| 4 × 4 | 1 | 14 | 14 | 20 | 20 | 24 | 24 |
| 4 × 4 | 2 | 1B | 1B | 1 | 1 | 1 | 1 |
| 4 × 4 | 3 | 0B | 0B | 0 | 0 | 0 | 0 |
| 4 × 4 | 4 | 15 | 15 | 21 | 21 | 25 | 25 |
| 4 × 4 | 5 | 14 | 14 | 26 | 26 | 26 | 26 |
| 4 × 4 | 6 | 5B | 5B | 5 | 5 | 5 | 5 |
| 4 × 4 | 7 | 4B | 4B | 4 | 4 | 4 | 4 |
| 4 × 4 | 8 | 3B | 3B | 3 | 3 | 3 | 3 |
| 4 × 4 | 9 | 6B | 6B | 6 | 6 | 6 | 6 |
| 4 × 4 | 10 | 9B | 9B | 9 | 9 | 9 | 9 |
| 4 × 4 | 11 | 8B | 8B | 8 | 8 | 8 | 8 |
| 4 × 4 | 12 | 7B | 7B | 7 | 7 | 7 | 7 |
| 4 × 4 | 13 | 6B | 6B | 6 | 6 | 6 | 6 |
| 4 × 4 | 14 | 13B | 13B | 13 | 13 | 13 | 13 |
| 4 × 4 | 15 | 12B | 12B | 12 | 12 | 12 | 12 |

Table 4 through Table 7 illustrates the location of the most probable joint neighboring blocks according to MBAFF coding. For example, the statistical analysis of a H.264 video bitstream reveals that the same frame/field MB property will likely (e.g., approximately >90% likelihood) propagate across adjacent MBs. That is, when a current MB pair is encoded as the frame_mb, it is substantially likely that the neighbor MBs A, B, C, and D are also encoded as the frame_mb. Similarly, when the current MB pair is encoded as a field_mb, it is substantially likely that the neighbor MBs A, B, C, and D are also encoded as field_mb. Accordingly, joint tables may be derived based on the statistical significance of the frame/field correlation for adjacent MBs that may further simplify locating neighbor MBs for a current MB. Table 4 illustrates the location of neighbor blocks A, B, C when all three belong to frame_mb type and the current MB is a top frame_mb. Table 5 illustrates the location of neighbor blocks A, B, C when all three belong to frame_mb type and the current MB is a bottom frame_mb. Table 6 illustrates the location of neighbor blocks A, B, C when all of three belong to field_mb type and the current MB is a top field_mb. Table 7 illustrates the location of neighbor blocks A, B, C when all three belong to field_mb type and the current MB is a bottom field_mb. In an embodiment, the reduced complexity illustrated by Table 4 through Table 7 may allow, for example the MB module 208 to operate more quickly and/or efficiently.

TABLE 4

The joint neighboring block A, B, C table when all of them are available and are of the frame_mb type, and the current MB is a top frame_mb

| BLK Type | BLK IDX | Neighboring block A | Neighboring block B | Neighboring block C |
|---|---|---|---|---|
| 16 × 16 | 0 | 28 | 22 | 27 |
| 16 × 8 | 0 | 28 | 22 | 27 |

TABLE 4-continued

The joint neighboring block A, B, C table when all of them are available and are of the frame_mb type, and the current MB is a top frame_mb

| BLK Type | BLK IDX | Neighboring block A | Neighboring block B | Neighboring block C |
|---|---|---|---|---|
| 16 × 8 | 1 | 30 | 2 | 29 |
| 8 × 16 | 0 | 28 | 22 | 24 |
| 8 × 16 | 1 | 1 | 24 | 27 |
| 8 × 8 | 0 | 28 | 22 | 24 |
| 8 × 8 | 1 | 1 | 24 | 27 |
| 8 × 8 | 2 | 30 | 2 | 6 |
| 8 × 8 | 3 | 9 | 6 | 3 |
| 8 × 4 | 0 | 28 | 22 | 24 |
| 8 × 4 | 1 | 29 | 0 | 28 |
| 8 × 4 | 2 | 1 | 24 | 27 |
| 8 × 4 | 3 | 3 | 4 | 1 |
| 8 × 4 | 4 | 30 | 2 | 6 |
| 8 × 4 | 5 | 31 | 8 | 30 |
| 8 × 4 | 6 | 9 | 6 | 3 |
| 8 × 4 | 7 | 11 | 12 | 9 |
| 4 × 8 | 0 | 28 | 22 | 23 |
| 4 × 8 | 1 | 0 | 23 | 24 |
| 4 × 8 | 2 | 1 | 24 | 25 |
| 4 × 8 | 3 | 4 | 25 | 27 |
| 4 × 8 | 4 | 30 | 2 | 3 |
| 4 × 8 | 5 | 8 | 3 | 6 |
| 4 × 8 | 6 | 9 | 6 | 7 |
| 4 × 8 | 7 | 12 | 7 | 6 |
| 4 × 4 | 0 | 28 | 22 | 23 |
| 4 × 4 | 1 | 0 | 23 | 24 |
| 4 × 4 | 2 | 29 | 0 | 1 |
| 4 × 4 | 3 | 2 | 1 | 0 |
| 4 × 4 | 4 | 1 | 24 | 25 |
| 4 × 4 | 5 | 4 | 25 | 27 |
| 4 × 4 | 6 | 3 | 4 | 5 |
| 4 × 4 | 7 | 6 | 5 | 4 |
| 4 × 4 | 8 | 30 | 2 | 3 |
| 4 × 4 | 9 | 8 | 3 | 6 |
| 4 × 4 | 10 | 31 | 8 | 9 |
| 4 × 4 | 11 | 10 | 9 | 8 |
| 4 × 4 | 12 | 9 | 6 | 7 |
| 4 × 4 | 13 | 12 | 7 | 6 |
| 4 × 4 | 14 | 11 | 12 | 13 |
| 4 × 4 | 15 | 14 | 13 | 12 |

TABLE 5

The joint neighboring block A, B, C table when all of them are available and are of the frame_mb type, and the current MB is a bottom frame_mb

| BLK Type | BLK IDX | Neighboring block A | Neighboring block B | Neighboring block C |
|---|---|---|---|---|
| 16 × 16 | 0 | 32 | 10 | 31 |
| 16 × 8 | 0 | 32 | 10 | 31 |
| 16 × 8 | 1 | 34 | 2B | 33 |
| 8 × 16 | 0 | 32 | 10 | 14 |
| 8 × 16 | 1 | 1B | 14 | 31 |
| 8 × 8 | 0 | 32 | 10 | 14 |
| 8 × 8 | 1 | 1B | 14 | 11 |
| 8 × 8 | 2 | 34 | 2B | 6B |
| 8 × 8 | 3 | 9B | 6B | 3B |
| 8 × 4 | 0 | 32 | 10 | 14 |
| 8 × 4 | 1 | 33 | 0B | 32 |
| 8 × 4 | 2 | 1B | 14 | 11 |
| 8 × 4 | 3 | 3B | 4B | 1B |
| 8 × 4 | 4 | 34 | 2B | 6B |
| 8 × 4 | 5 | 35 | 8B | 34 |
| 8 × 4 | 6 | 9B | 6B | 3B |
| 8 × 4 | 7 | 11B | 12B | 9B |
| 4 × 8 | 0 | 32 | 10 | 11 |
| 4 × 8 | 1 | 0B | 11 | 14 |
| 4 × 8 | 2 | 1B | 14 | 15 |
| 4 × 8 | 3 | 4B | 15 | 14 |
| 4 × 8 | 4 | 34 | 2B | 3B |
| 4 × 8 | 5 | 8B | 3B | 6B |
| 4 × 8 | 6 | 9B | 6B | 7B |
| 4 × 8 | 7 | 12B | 7B | 6B |
| 4 × 4 | 0 | 32 | 10 | 11 |
| 4 × 4 | 1 | 0B | 11 | 14 |
| 4 × 4 | 2 | 33 | 0B | 1B |
| 4 × 4 | 3 | 2B | 1B | 0B |
| 4 × 4 | 4 | 1B | 14 | 15 |
| 4 × 4 | 5 | 4B | 15 | 14 |
| 4 × 4 | 6 | 3B | 4B | 5B |
| 4 × 4 | 7 | 6B | 5B | 4B |
| 4 × 4 | 8 | 34 | 2B | 3B |
| 4 × 4 | 9 | 8B | 3B | 6B |
| 4 × 4 | 10 | 35 | 8B | 9B |
| 4 × 4 | 11 | 10B | 9B | 8B |
| 4 × 4 | 12 | 9B | 6B | 7B |
| 4 × 4 | 13 | 12B | 7B | 6B |
| 4 × 4 | 14 | 11B | 12B | 13B |
| 4 × 4 | 15 | 14B | 13B | 12B |

TABLE 6

The joint neighboring block A, B, C table when all of them are available and are of the field_mb type, and the current MB is a top field_mb

| BLK Type | BLK IDX | Neighboring block A | Neighboring block B | Neighboring block C |
|---|---|---|---|---|
| 16 × 16 | 0 | 28 | 18 | 26 |
| 16 × 8 | 0 | 28 | 18 | 26 |
| 16 × 8 | 1 | 30 | 2 | 29 |
| 8 × 16 | 0 | 28 | 18 | 20 |
| 8 × 16 | 1 | 1 | 20 | 26 |
| 8 × 8 | 0 | 28 | 18 | 20 |
| 8 × 8 | 1 | 1 | 20 | 26 |
| 8 × 8 | 2 | 30 | 2 | 6 |
| 8 × 8 | 3 | 9 | 6 | 3 |
| 8 × 4 | 0 | 28 | 18 | 20 |
| 8 × 4 | 1 | 29 | 0 | 28 |
| 8 × 4 | 2 | 1 | 20 | 26 |
| 8 × 4 | 3 | 3 | 4 | 1 |
| 8 × 4 | 4 | 30 | 2 | 6 |
| 8 × 4 | 5 | 31 | 8 | 30 |
| 8 × 4 | 6 | 9 | 6 | 3 |
| 8 × 4 | 7 | 11 | 12 | 9 |
| 4 × 8 | 0 | 28 | 18 | 19 |
| 4 × 8 | 1 | 0 | 19 | 20 |
| 4 × 8 | 2 | 1 | 20 | 21 |
| 4 × 8 | 3 | 4 | 21 | 26 |
| 4 × 8 | 4 | 30 | 2 | 3 |
| 4 × 8 | 5 | 8 | 3 | 6 |
| 4 × 8 | 6 | 9 | 6 | 7 |
| 4 × 8 | 7 | 12 | 7 | 6 |
| 4 × 4 | 0 | 28 | 18 | 19 |
| 4 × 4 | 1 | 0 | 19 | 20 |
| 4 × 4 | 2 | 29 | 0 | 1 |
| 4 × 4 | 3 | 2 | 1 | 0 |
| 4 × 4 | 4 | 1 | 20 | 21 |
| 4 × 4 | 5 | 4 | 21 | 26 |
| 4 × 4 | 6 | 3 | 4 | 5 |
| 4 × 4 | 7 | 6 | 5 | 4 |
| 4 × 4 | 8 | 30 | 2 | 3 |
| 4 × 4 | 9 | 8 | 3 | 6 |
| 4 × 4 | 10 | 31 | 8 | 9 |
| 4 × 4 | 11 | 10 | 9 | 8 |
| 4 × 4 | 12 | 9 | 6 | 7 |
| 4 × 4 | 13 | 12 | 7 | 6 |

TABLE 6-continued

The joint neighboring block A, B, C table when all of them are available and are of the field_mb type, and the current MB is a top field_mb

| BLK Type | BLK IDX | Neighboring block A | Neighboring block B | Neighboring block C |
|---|---|---|---|---|
| 4 × 4 | 14 | 11 | 12 | 13 |
| 4 × 4 | 15 | 14 | 13 | 12 |

TABLE 7

The joint neighboring block A, B, C table when all of them are available and are of the field_mb type, and the current MB is a bottom field_mb

| BLK Type | BLK IDX | Neighboring block A | Neighboring block B | Neighboring block C |
|---|---|---|---|---|
| 16 × 16 | 0 | 32 | 22 | 27 |
| 16 × 8 | 0 | 32 | 22 | 27 |
| 16 × 8 | 1 | 34 | 2 | 33 |
| 8 × 16 | 0 | 32 | 22 | 24 |
| 8 × 16 | 1 | 1B | 24 | 27 |
| 8 × 8 | 0 | 32 | 22 | 24 |
| 8 × 8 | 1 | 1B | 24 | 27 |
| 8 × 8 | 2 | 34 | 2 | 6 |
| 8 × 8 | 3 | 9B | 6 | 3 |
| 8 × 4 | 0 | 32 | 22 | 24 |
| 8 × 4 | 1 | 33 | 0 | 32 |
| 8 × 4 | 2 | 1B | 24 | 27 |
| 8 × 4 | 3 | 3B | 4 | 1 |
| 8 × 4 | 4 | 34 | 2 | 6 |
| 8 × 4 | 5 | 35 | 8 | 34 |
| 8 × 4 | 6 | 9B | 6 | 3 |
| 8 × 4 | 7 | 11B | 12 | 9 |
| 4 × 8 | 0 | 32 | 22 | 23 |
| 4 × 8 | 1 | 0B | 23 | 24 |
| 4 × 8 | 2 | 1B | 24 | 25 |
| 4 × 8 | 3 | 4B | 25 | 27 |
| 4 × 8 | 4 | 34 | 2 | 3 |
| 4 × 8 | 5 | 8B | 3 | 6 |
| 4 × 8 | 6 | 9B | 6 | 7 |
| 4 × 8 | 7 | 12B | 7 | 6 |
| 4 × 4 | 0 | 32 | 22 | 23 |
| 4 × 4 | 1 | 0B | 23 | 24 |
| 4 × 4 | 2 | 33 | 0 | 1 |
| 4 × 4 | 3 | 2B | 1 | 0 |
| 4 × 4 | 4 | 1B | 24 | 25 |
| 4 × 4 | 5 | 4B | 25 | 27 |
| 4 × 4 | 6 | 3B | 4 | 5 |
| 4 × 4 | 7 | 6B | 5 | 4 |
| 4 × 4 | 8 | 34 | 2 | 3 |
| 4 × 4 | 9 | 8B | 3 | 6 |
| 4 × 4 | 10 | 35 | 8 | 9 |
| 4 × 4 | 11 | 10B | 9 | 8 |
| 4 × 4 | 12 | 9B | 6 | 7 |
| 4 × 4 | 13 | 12B | 7 | 6 |
| 4 × 4 | 14 | 11B | 12 | 13 |
| 4 × 4 | 15 | 14B | 13 | 12 |

As introduced above, there are conditions under which certain neighbor MBs are unavailable. For example, when neighbor MB A is not available, the value of indices 28-35 may be replaces as not available (N/A). Table 8 represents Table 1 for such a condition. When neighbor MB B is not available, the values of indices 18-25 may be replaced as not available (N/A). Table 9 represents Table 2 for such an instance. When neighbor MB C is not available, the value of indices 26-27 of Table 3 may be replaced as either 16 or 17 as described above based on the availability and properties of neighbor MB D and the current MB.

TABLE 8

The neighboring block A table when the neighboring MB A is NOT available

| BLK Type | BLK IDX | [Cur(T, FRM) OR [Cur(T, FLD)] | [Cur(B, FRM) OR [Cur(B, FLD)] |
|---|---|---|---|
| 16 × 16 | 0 | N/A | N/A |
| 16 × 8 | 0 | N/A | N/A |
| 16 × 8 | 1 | N/A | N/A |
| 8 × 16 | 0 | N/A | N/A |
| 8 × 16 | 1 | 1 | 1B |
| 8 × 8 | 0 | N/A | N/A |
| 8 × 8 | 1 | 1 | 1B |
| 8 × 8 | 2 | N/A | N/A |
| 8 × 8 | 3 | 9 | 9B |
| 8 × 4 | 0 | N/A | N/A |
| 8 × 4 | 1 | N/A | N/A |
| 8 × 4 | 2 | 1 | 1B |
| 8 × 4 | 3 | 3 | 3B |
| 8 × 4 | 4 | N/A | N/A |
| 8 × 4 | 5 | N/A | N/A |
| 8 × 4 | 6 | 9 | 9B |
| 8 × 4 | 7 | 11 | 11B |
| 4 × 8 | 0 | N/A | N/A |
| 4 × 8 | 1 | 0 | 0B |
| 4 × 8 | 2 | 1 | 1B |
| 4 × 8 | 3 | 4 | 4B |
| 4 × 8 | 4 | N/A | N/A |
| 4 × 8 | 5 | 8 | 8B |
| 4 × 8 | 6 | 9 | 9B |
| 4 × 8 | 7 | 12 | 12B |
| 4 × 4 | 0 | N/A | N/A |
| 4 × 4 | 1 | 0 | 0B |
| 4 × 4 | 2 | N/A | N/A |
| 4 × 4 | 3 | 2 | 2B |
| 4 × 4 | 4 | 1 | 1B |
| 4 × 4 | 5 | 4 | 4B |
| 4 × 4 | 6 | 3 | 3B |
| 4 × 4 | 7 | 6 | 6B |
| 4 × 4 | 8 | N/A | N/A |
| 4 × 4 | 9 | 8 | 8B |
| 4 × 4 | 10 | N/A | N/A |
| 4 × 4 | 11 | 10 | 10B |
| 4 × 4 | 12 | 9 | 9B |
| 4 × 4 | 13 | 12 | 12B |
| 4 × 4 | 14 | 11 | 11B |
| 4 × 4 | 15 | 14 | 14B |

TABLE 9

The neighboring block B table for the neighboring MB B is NOT available

| BLK Type | BLK IDX | [Cur(T, FRM)] OR [Cur(T, FLD) OR [Cur(B, FLD)] | Cur(B, FRM) |
|---|---|---|---|
| 16 × 16 | 0 | N/A | 10 |
| 16 × 8 | 0 | N/A | 10 |
| 16 × 8 | 1 | 2 | 2B |
| 8 × 16 | 0 | N/A | 10 |
| 8 × 16 | 1 | N/A | 14 |
| 8 × 8 | 0 | N/A | 10 |
| 8 × 8 | 1 | N/A | 14 |
| 8 × 8 | 2 | 2 | 2B |
| 8 × 8 | 3 | 6 | 6B |
| 8 × 4 | 0 | N/A | 10 |
| 8 × 4 | 1 | 0 | 0B |
| 8 × 4 | 2 | N/A | 14 |
| 8 × 4 | 3 | 4 | 4B |
| 8 × 4 | 4 | 2 | 2B |
| 8 × 4 | 5 | 8 | 8B |
| 8 × 4 | 6 | 6 | 6B |
| 8 × 4 | 7 | 12 | 12B |

TABLE 9-continued

The neighboring block B table for the neighboring MB B is NOT available

| BLK Type | BLK IDX | [Cur(T, FRM)] OR [Cur(T, FLD) OR [Cur(B, FLD)] | Cur(B, FRM) |
|---|---|---|---|
| 4 × 8 | 0 | N/A | 10 |
| 4 × 8 | 1 | N/A | 11 |
| 4 × 8 | 2 | N/A | 14 |
| 4 × 8 | 3 | N/A | 15 |
| 4 × 8 | 4 | 2 | 2B |
| 4 × 8 | 5 | 3 | 3B |
| 4 × 8 | 6 | 6 | 6B |
| 4 × 8 | 7 | 7 | 7B |
| 4 × 4 | 0 | N/A | 10 |
| 4 × 4 | 1 | N/A | 11 |
| 4 × 4 | 2 | 0 | 0B |
| 4 × 4 | 3 | 1 | 1B |
| 4 × 4 | 4 | N/A | 14 |
| 4 × 4 | 5 | N/A | 15 |
| 4 × 4 | 6 | 4 | 4B |
| 4 × 4 | 7 | 5 | 5B |
| 4 × 4 | 8 | 2 | 2B |
| 4 × 4 | 9 | 3 | 3B |
| 4 × 4 | 10 | 8 | 8B |
| 4 × 4 | 11 | 9 | 9B |
| 4 × 4 | 12 | 6 | 6B |
| 4 × 4 | 13 | 7 | 7B |
| 4 × 4 | 14 | 12 | 12B |
| 4 × 4 | 15 | 13 | 13B |

TABLE 10

The neighboring block C table when the neighboring MBs A, B, D are available, but C is not available

| BLK Type | BLK IDX | [Cur(T, FM) && NA(FM)] OR [Cur(T, FD) && ND(FM) && NB(FM) && NA(FD)] | [Cur(T, FD) && ND(FD) && NB(FD) && NA(FD)] | Cur(T, FM) && NA(FD) | [Cur(T, FD) && ND(FM) && NB(FM) && NA(FM)] OR [Cur(B, FD) && NA(FM)] | [Cur(T, FD) && ND(FD) && NB(FM) && NA(FM)] | Cur(B, FD) && NA(FD) | Cur(T, FD) && ND(FM) && NB(FD) && NA(FD) |
|---|---|---|---|---|---|---|---|---|
| 16 × 16 | 0 | 17 | 16 | 17 | 17 | 16 | 16 | 17 |
| 16 × 8 | 0 | 17 | 16 | 17 | 17 | 16 | 16 | 17 |
| 16 × 8 | 1 | 29 | 29 | 32 | 31 | 31 | 33 | 29 |
| 8 × 16 | 0 | 24 | 24 | 24 | 24 | 24 | 24 | 20 |
| 8 × 16 | 1 | 17 | 16 | 17 | 17 | 16 | 16 | 17 |
| 8 × 8 | 0 | 24 | 24 | 24 | 24 | 24 | 24 | 20 |
| 8 × 8 | 1 | 17 | 16 | 17 | 17 | 16 | 16 | 17 |
| 8 × 8 | 2 | 6 | 6 | 6 | 6 | 6 | 6 | 6 |
| 8 × 8 | 3 | 3 | 3 | 3 | 3 | 3 | 3 | 3 |
| 8 × 4 | 0 | 24 | 24 | 24 | 24 | 24 | 24 | 20 |
| 8 × 4 | 1 | 28 | 28 | 32 | 29 | 29 | 32 | 28 |
| 8 × 4 | 2 | 17 | 16 | 17 | 17 | 16 | 16 | 17 |
| 8 × 4 | 3 | 1 | 1 | 1 | 1 | 1 | 1 | 1 |
| 8 × 4 | 4 | 6 | 6 | 6 | 6 | 6 | 6 | 6 |
| 8 × 4 | 5 | 30 | 30 | 33 | 33 | 33 | 34 | 30 |
| 8 × 4 | 6 | 3 | 3 | 3 | 3 | 3 | 3 | 3 |
| 8 × 4 | 7 | 9 | 9 | 9 | 9 | 9 | 9 | 9 |
| 4 × 8 | 0 | 23 | 23 | 23 | 23 | 23 | 23 | 19 |
| 4 × 8 | 1 | 24 | 24 | 24 | 24 | 24 | 24 | 20 |
| 4 × 8 | 2 | 25 | 25 | 25 | 25 | 25 | 25 | 21 |
| 4 × 8 | 3 | 17 | 16 | 17 | 17 | 16 | 16 | 17 |
| 4 × 8 | 4 | 3 | 3 | 3 | 3 | 3 | 3 | 3 |
| 4 × 8 | 5 | 6 | 6 | 6 | 6 | 6 | 6 | 6 |
| 4 × 8 | 6 | 7 | 7 | 7 | 7 | 7 | 7 | 7 |
| 4 × 8 | 7 | 6 | 6 | 6 | 6 | 6 | 6 | 6 |
| 4 × 4 | 0 | 23 | 23 | 23 | 23 | 23 | 23 | 19 |
| 4 × 4 | 1 | 24 | 24 | 24 | 24 | 24 | 24 | 20 |
| 4 × 4 | 2 | 1 | 1 | 1 | 1 | 1 | 1 | 1 |
| 4 × 4 | 3 | 0 | 0 | 0 | 0 | 0 | 0 | 0 |
| 4 × 4 | 4 | 25 | 25 | 25 | 25 | 25 | 25 | 21 |
| 4 × 4 | 5 | 17 | 16 | 17 | 17 | 16 | 16 | 17 |
| 4 × 4 | 6 | 5 | 5 | 5 | 5 | 5 | 5 | 5 |
| 4 × 4 | 7 | 4 | 4 | 4 | 4 | 4 | 4 | 4 |
| 4 × 4 | 8 | 3 | 3 | 3 | 3 | 3 | 3 | 3 |
| 4 × 4 | 9 | 6 | 6 | 6 | 6 | 6 | 6 | 6 |
| 4 × 4 | 10 | 9 | 9 | 9 | 9 | 9 | 9 | 9 |
| 4 × 4 | 11 | 8 | 8 | 8 | 8 | 8 | 8 | 8 |
| 4 × 4 | 12 | 7 | 7 | 7 | 7 | 7 | 7 | 7 |
| 4 × 4 | 13 | 6 | 6 | 6 | 6 | 6 | 6 | 6 |

TABLE 10-continued

The neighboring block C table when the neighboring MBs A, B, D are available, but C is not available

| BLK Type | BLK IDX | | | | | | | |
|---|---|---|---|---|---|---|---|---|
| 4 × 4 | 14 | 13 | 13 | 13 | 13 | 13 | 13 | 13 |
| 4 × 4 | 15 | 12 | 12 | 12 | 12 | 12 | 12 | 12 |

| BLK Type | BLK IDX | Cur(T, FD) && ND(FD) && NB(FD) && NA(FD) | Cur(T, FD) && NC(FM) && NB(FD) && NA(FM) | Cur(T, FD) && NC(FD) && NB(FD) && NA(FM) | Cur(B, FM) && NA(FM) | Cur(B, FM) && NA(FD) | Cur(T, FD) && ND(FD) && NB(FD) && NA(FD) | Cur(T, FD) && ND(FM) && NB(FD) && NA(FD) |
|---|---|---|---|---|---|---|---|---|
| 16 × 16 | 0 | 16 | 17 | 16 | 31 | 33 | 16 | 17 |
| 16 × 8 | 0 | 16 | 17 | 16 | 31 | 33 | 16 | 17 |
| 16 × 8 | 1 | 29 | 31 | 31 | 33 | 34 | 29 | 29 |
| 8 × 16 | 0 | 20 | 20 | 20 | 14 | 14 | 20 | 20 |
| 8 × 16 | 1 | 16 | 17 | 16 | 31 | 33 | 16 | 17 |
| 8 × 8 | 0 | 20 | 20 | 20 | 14 | 14 | 20 | 20 |
| 8 × 8 | 1 | 16 | 17 | 16 | 11 | 11 | 16 | 17 |
| 8 × 8 | 2 | 6 | 6 | 6 | 6B | 6B | 6 | 6 |
| 8 × 8 | 3 | 3 | 3 | 3 | 3B | 3B | 3 | 3 |
| 8 × 4 | 0 | 20 | 20 | 20 | 14 | 14 | 20 | 20 |
| 8 × 4 | 1 | 28 | 29 | 29 | 32 | 34 | 28 | 28 |
| 8 × 4 | 2 | 16 | 17 | 16 | 11 | 11 | 16 | 17 |
| 8 × 4 | 3 | 1 | 1 | 1 | 1B | 1B | 1 | 1 |
| 8 × 4 | 4 | 6 | 6 | 6 | 6B | 6B | 6 | 6 |
| 8 × 4 | 5 | 30 | 33 | 33 | 34 | 35 | 30 | 30 |
| 8 × 4 | 6 | 3 | 3 | 3 | 3B | 3B | 3 | 3 |
| 8 × 4 | 7 | 9 | 9 | 9 | 9B | 9B | 9 | 9 |
| 4 × 8 | 0 | 19 | 19 | 19 | 11 | 11 | 19 | 19 |
| 4 × 8 | 1 | 20 | 20 | 20 | 14 | 14 | 20 | 20 |
| 4 × 8 | 2 | 21 | 21 | 21 | 15 | 15 | 21 | 21 |
| 4 × 8 | 3 | 16 | 17 | 16 | 14 | 14 | 16 | 17 |
| 4 × 8 | 4 | 3 | 3 | 3 | 3B | 3B | 3 | 3 |
| 4 × 8 | 5 | 6 | 6 | 6 | 6B | 6B | 6 | 6 |
| 4 × 8 | 6 | 7 | 7 | 7 | 7B | 7B | 7 | 7 |
| 4 × 8 | 7 | 6 | 6 | 6 | 6B | 6B | 6 | 6 |
| 4 × 4 | 0 | 19 | 19 | 19 | 11 | 11 | 19 | 19 |
| 4 × 4 | 1 | 20 | 20 | 20 | 14 | 14 | 20 | 20 |
| 4 × 4 | 2 | 1 | 1 | 1 | 1B | 1B | 1 | 1 |
| 4 × 4 | 3 | 0 | 0 | 0 | 0B | 0B | 0 | 0 |
| 4 × 4 | 4 | 21 | 21 | 21 | 15 | 15 | 21 | 21 |
| 4 × 4 | 5 | 16 | 17 | 16 | 14 | 14 | 16 | 17 |
| 4 × 4 | 6 | 5 | 5 | 5 | 5B | 5B | 5 | 5 |
| 4 × 4 | 7 | 4 | 4 | 4 | 4B | 4B | 4 | 4 |
| 4 × 4 | 8 | 3 | 3 | 3 | 3B | 3B | 3 | 3 |
| 4 × 4 | 9 | 6 | 6 | 6 | 6B | 6B | 6 | 6 |
| 4 × 4 | 10 | 9 | 9 | 9 | 9B | 9B | 9 | 9 |
| 4 × 4 | 11 | 8 | 8 | 8 | 8B | 8B | 8 | 8 |
| 4 × 4 | 12 | 7 | 7 | 7 | 7B | 7B | 7 | 7 |
| 4 × 4 | 13 | 6 | 6 | 6 | 6B | 6B | 6 | 6 |
| 4 × 4 | 14 | 13 | 13 | 13 | 13B | 13B | 13 | 13 |
| 4 × 4 | 15 | 12 | 12 | 12 | 12B | 12B | 12 | 12 |

| BLK Type | BLK IDX | Cur(T, FD) && ND(FD) && NB(FD) && NA(FM) | Cur(T, FD) && ND(FM) && NB(FD) && NA(FM) | Cur(T, FD) && ND(FD) && NB(FM) && NA(FD) | Cur(T, FD) && ND(FM) && NB(FM) && NA(FD) | Cur(T, FD) && ND(FD) && NB(FM) && NA(FM) | Cur(T, FD) && ND(FM) && NB(FM) && NA(FM) |
|---|---|---|---|---|---|---|---|
| 16 × 16 | 0 | 16 | 17 | 16 | 17 | 16 | 17 |
| 16 × 8 | 0 | 16 | 17 | 16 | 17 | 16 | 17 |
| 16 × 8 | 1 | 31 | 31 | 29 | 29 | 31 | 31 |
| 8 × 16 | 0 | 20 | 20 | 24 | 24 | 24 | 24 |
| 8 × 16 | 1 | 16 | 17 | 16 | 17 | 16 | 17 |
| 8 × 8 | 0 | 20 | 20 | 24 | 24 | 24 | 24 |
| 8 × 8 | 1 | 16 | 17 | 16 | 17 | 16 | 17 |
| 8 × 8 | 2 | 6 | 6 | 6 | 6 | 6 | 6 |
| 8 × 8 | 3 | 3 | 3 | 3 | 3 | 3 | 3 |
| 8 × 4 | 0 | 20 | 20 | 24 | 24 | 24 | 24 |
| 8 × 4 | 1 | 29 | 29 | 28 | 28 | 29 | 29 |
| 8 × 4 | 2 | 16 | 17 | 16 | 17 | 16 | 17 |
| 8 × 4 | 3 | 1 | 1 | 1 | 1 | 1 | 1 |
| 8 × 4 | 4 | 6 | 6 | 6 | 6 | 6 | 6 |
| 8 × 4 | 5 | 33 | 33 | 30 | 30 | 33 | 33 |
| 8 × 4 | 6 | 3 | 3 | 3 | 3 | 3 | 3 |
| 8 × 4 | 7 | 9 | 9 | 9 | 9 | 9 | 9 |
| 4 × 8 | 0 | 19 | 19 | 23 | 23 | 23 | 23 |
| 4 × 8 | 1 | 20 | 20 | 24 | 24 | 24 | 24 |
| 4 × 8 | 2 | 21 | 21 | 25 | 25 | 25 | 25 |
| 4 × 8 | 3 | 16 | 17 | 16 | 17 | 16 | 17 |
| 4 × 8 | 4 | 3 | 3 | 3 | 3 | 3 | 3 |
| 4 × 8 | 5 | 6 | 6 | 6 | 6 | 6 | 6 |

TABLE 10-continued

The neighboring block C table when the neighboring MBs A, B, D are available, but C is not available

| | | | | | | | |
|---|---|---|---|---|---|---|---|
| 4 × 8 | 6 | 7 | 7 | 7 | 7 | 7 | 7 |
| 4 × 8 | 7 | 6 | 6 | 6 | 6 | 6 | 6 |
| 4 × 4 | 0 | 19 | 19 | 23 | 23 | 23 | 23 |
| 4 × 4 | 1 | 20 | 20 | 24 | 24 | 24 | 24 |
| 4 × 4 | 2 | 1 | 1 | 1 | 1 | 1 | 1 |
| 4 × 4 | 3 | 0 | 0 | 0 | 0 | 0 | 0 |
| 4 × 4 | 4 | 21 | 21 | 25 | 25 | 25 | 25 |
| 4 × 4 | 5 | 16 | 17 | 16 | 17 | 16 | 17 |
| 4 × 4 | 6 | 5 | 5 | 5 | 5 | 5 | 5 |
| 4 × 4 | 7 | 4 | 4 | 4 | 4 | 4 | 4 |
| 4 × 4 | 8 | 3 | 3 | 3 | 3 | 3 | 3 |
| 4 × 4 | 9 | 6 | 6 | 6 | 6 | 6 | 6 |
| 4 × 4 | 10 | 9 | 9 | 9 | 9 | 9 | 9 |
| 4 × 4 | 11 | 8 | 8 | 8 | 8 | 8 | 8 |
| 4 × 4 | 12 | 7 | 7 | 7 | 7 | 7 | 7 |
| 4 × 4 | 13 | 6 | 6 | 6 | 6 | 6 | 6 |
| 4 × 4 | 14 | 13 | 13 | 13 | 13 | 13 | 13 |
| 4 × 4 | 15 | 12 | 12 | 12 | 12 | 12 | 12 |

In an embodiment, the derivation of the neighbor MB C index may require information related to neighbor MBs A, B, C, and D. However, there may be some locations of the current MB or "corner cases" for which neighbor MBs may be unavailable to derive neighbor MB C. Accordingly, in an embodiment the aforementioned tables may be extended to cover additional conditions of unavailable neighboring MBs. For example, if neighboring MB C is available, then Table 3 of an embodiment may be modified to produce three new tables for which:

neighboring MB A is not available, but neighboring MB B is available;
neighboring MB B is not available, but neighboring MB A is available; and
both neighboring MB A and B are not available.

If neighboring MB C is not available, then Table 10 of an embodiment may be modified to produce seven new tables for which:

neighboring MB A is not available, but neighboring MB B and D are available;
neighboring MB B is not available, but neighboring MB A and D are available;
neighboring MB D is not available, but neighboring MB A and B are available;
neighboring MB A and B are not available, but neighboring MB D is available;
neighboring MB A and D are not available, but neighboring MB B is available;
neighboring MB B and D are not available, but neighboring MB A is available; and
all three of neighboring MB A, B and D are not available.

For the listed conditions, the following replacement rules may be applied to generate additional tables:

when neighbor MB A is not available, the value of indices 28-35 may be replaced as not available (N/A) (e.g., similar to generating Table 8 from Table 1);
when neighbor MB B is not available, the value of indices 18-25 may be replaced as not available (N/A) (e.g., similar to generating Table 9 from Table 2); and
when neighbor MB D is not available, the value of indices 16-17 will be replaced as not available (N/A).

Tables 1 through 10, and their extensions according to the extension rules apply to MBAFF coding. However, neighboring block tables may be similarly generated for non-MBAFF coding as illustrated by. As illustrated by FIG. 7, indices may be used to indicate locations for the current MB and neighboring MBs for non-MBAFF coding. For example, the indices 0-15 may represent a 4×4 block in the current MB (e.g., current MB 410). Other indices may represent the neighboring MBs. For example, indices 28-31 may represent neighbor MB A 420, 22-25 may represent neighbor MB B 430, 27 may represent neighbor MB C 440, and 17 may represent neighbor MB D 450. The indices may thereafter be used as part of the tables of an embodiment to reference locations of current and neighboring MBs as will be more fully explained below.

More specifically, the derivation of the neighboring block tables for non-MBAFF coding may be simpler than the derivation for MBAFF coding. As the video will be coded in the unit of MB versus MB-pair, and all MBs within a slice will share the same frame/field property, in an embodiment it is unnecessary to parameterize the derivation of the tables in terms of top/bottom, and frame/field. With similar indices as illustrated by FIG. 7 (e.g., non-MBAFF) positioned as by FIG. 6 (e.g., MBAFF), the neighbor MB tables of an embodiment are already illustrated in Table 1 though Table 10 above. For example the location of the non-MBAFF neighbor MBs are illustrated in the columns of Table 1 thorough Table 10 for which the current MB and the neighbor MBs are of the frame_mb type. Specifically, the non-MBAFF neighbor MB tables are illustrated by the third column of Table 1 through Table 3 and Table 8 through Table 10. Further, the most probable joint neighbor MB table is Table 4.

Figure 8:
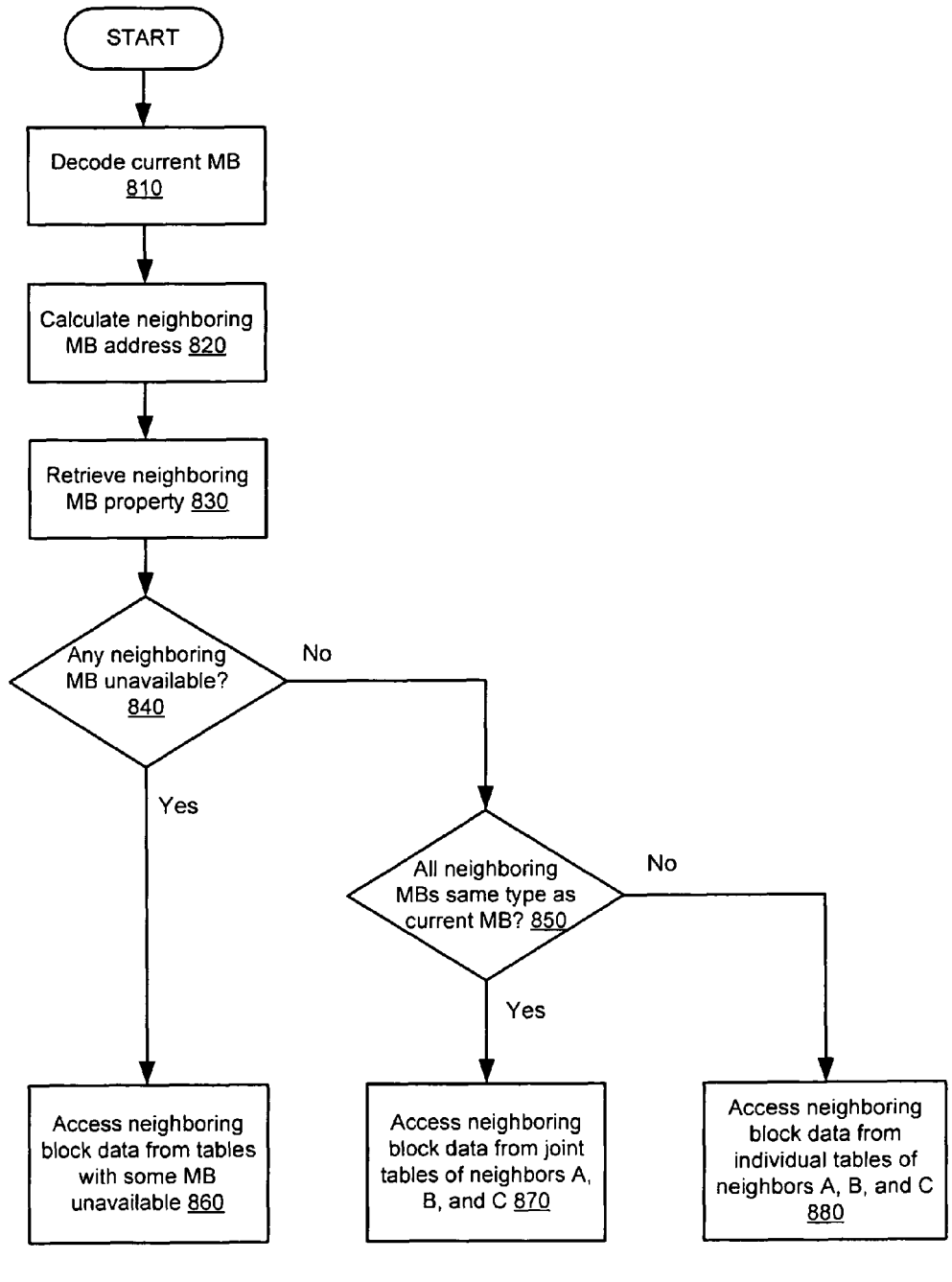
FIG. 8 illustrates a logic flow of an embodiment.

FIG. 8 illustrates the process flow of an embodiment. At 810, a current MB of a video may be decoded. In an embodiment, the current MB is decoded according to a JSVC or H.264 video decoding standard. At 820, the addresses of the MBs that neighbor the current MB are calculated. Thereafter, the property of the neighbor bay be retrieved at 830. As noted above, depending on the location of the current MB in the video frame or picture (e.g., at the frame or picture edges), a neighbor MB may be unavailable. At 840, it is determined whether or not a neighbor MB may be unavailable based on the location of the current MB. If any of the neighbor MBs are unavailable, at 860 neighbor MB data may be retrieved from the tables pre-calculated to represent unavailable neighbor MBs (e.g., Table 8, Table 9, or Table 10). If all of the neighbor MBs are available, it is determined at 850 whether all of the neighbor MBs is of the same type (e.g., frame or field) as the current MB. If yes, at 870 neighbor MB data may be retrieved from joint tables of neighbors A, B, and C (e.g., Table 4, Table 5, Table 6, or Table 7). If no, at 880 neighbor MB data may be retrieved from individual tables of neighbor MBs A, B, and C (e.g., Table 1, Table 2, or Table 3). It is to be understood that the process flow 800 may apply to both MBAFF and non-MBAFF coding, the latter of which would omit block 880 as all neighbor MBs and the current MB would have the same type.

The result of an embodiment is that the complexity with which information with respect to neighbor MBs is reduced. For example, H.264 video codec developers may utilize the reference software (JM) developed by H.264 standard committee to implement the a similar generation of neighbor MB information. The JM utilizes a generic function called getluma4×4neighbor( ) that includes sub-functions to locating the neighbor blocks. The getluma4×4neighbor( ) function consumes approximately 70 operational cycles per execution, and the function must be called must be called four times to locate all of the four neighboring MBs A, B, C, and D. Further, for the worst case scenario for which the current MB is represented by 16 4×4 blocks, the getluma4×4neighbor( ) function may be called up to 16 times to generate approximately 16*4*70=4480 cycles per current MB. As there are 8160 MBs per picture for 1920×1080 high definition video, the accumulated number of required operation cycles becomes substantially cumbersome. Alternatively, an embodiment consumes fewer than 30 cycles per current MB to locate neighbor MBs, thereby substantially reducing the complexity and computation resources required to locate neighbor MBs and their respective data to process the current MB.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. An apparatus comprising:
a media processing node to decode a current macroblock (MB) comprising one or more blocks, the media processing node to retrieve a plurality of indices from a pre-computed table, the indices identifying one or more neighboring blocks of each of the one or more blocks, at least one of the one or more neighboring blocks of at least one of the one or more blocks located in a neighboring MB, the media processing node to select a neighboring block table based on availability of at least one of the one or more neighboring blocks and retrieve properties of the identified neighboring blocks from the neighboring block table to decode the current MB and decode the current MB at least in part based on the retrieved properties of the identified neighboring blocks.

2. The apparatus of claim 1, the media processing node to include a macroblock module, the macroblock module to determine if any neighboring MBs are unavailable for the current MB, unavailability based on at least one of a location of the current MB relative to a border or what slice the at least one of the one or more neighboring blocks belong to.

3. The apparatus of claim 2, the macroblock module to further determine if the neighboring MBs are the same type as the current MB, type based on whether the current MB is a frame or field MB.

4. A system comprising:
a wired communications medium; and
a media processing node operating in a media processing device coupled to the communications medium to decode a current macroblock (MB) comprising one or more blocks, the media processing node to retrieve a plurality of indices from a pre-computed table, the indices identifying one or more neighboring blocks of each of the one or more blocks, at least one of the one or more neighboring blocks of at least one of the one or more blocks located in a neighboring MB, the media processing node to select a neighboring block table based on availability of at least one of the one or more neighboring blocks and retrieve properties of the identified neighboring blocks from the neighboring block table to decode the current MB and decode the current MB at least in part based on the retrieved properties of the identified neighboring blocks.

5. The system of claim 4, the media processing node to include a macroblock module, the macroblock module to determine if any neighboring MBs are unavailable for the current MB, unavailability based on at least one of a location of the current MB relative to a border or what slice the at least one of the one or more neighboring blocks belong to.

6. The system of claim 5, the macroblock module to further determine if the neighboring MBs are the same type as the current MB, type based on whether the current MB is a frame or field MB.

7. A method comprising:
decoding a current macroblock (MB) comprising one or more blocks in a media processing device, including:
calculating the addresses of a plurality of neighboring MBs of the current MB at least in part from a pre-computed table of probable neighboring block locations for all possible current MB and neighboring MB configurations;
using the addresses to retrieve a property for each neighboring MB;
determining if any of the neighboring MBs are unavailable based on the property of each neighboring MB;
retrieving a plurality of indices from the pre-computed table based on whether any of the neighboring MBs are unavailable, the indices identifying one or more neighboring blocks of each of the one or more blocks of the current MB, at least one of the one or more neighboring blocks of at least one of the one or more blocks located in one of the neighboring MBs; and
selecting a neighboring block table based on availability of at least one of the plurality of neighboring MBs;
retrieving properties of the identified one or more neighboring blocks from the neighboring block table to decode the current MB and decoding the current MB at least in part based on the retrieved properties of the identified one or more neighboring blocks.

8. The method of claim 7 further comprising:
determining if each of the neighboring MBs has the same type as the current MB if all the neighboring MBs are available, availability based on at least one of a location of the current MB relative to a border or what slice the at least one of the one or more neighboring blocks belong to.

9. The method of claim 8 further comprising:
accessing neighboring block data from a pre-calculated joint table if each of the neighboring MBs has the same type as the current MB, type based on whether the current MB is a frame or field MB.

10. The method of claim 9 further comprising:
accessing neighboring block data from a pre-calculated individual table if each of the neighboring MBs does not have the same type as the current MB, type based on whether the current MB is a frame or field MB.

11. An article comprising a non-transitory machine-readable storage medium containing instructions that if executed enable a system to:
decode a current macroblock (MB) comprising one or more blocks including to
calculate the addresses of a plurality of neighboring MBs of the current MB at least in part from a pre-computed table of probable neighboring block locations for all possible current MB and neighboring MB configurations;
use the addresses to retrieve a property for each neighboring MB;
determine if any of the neighboring MBs are unavailable based on the property of each neighboring MB;
retrieve a plurality of indices from the pre-computed table based on whether any of the neighboring MBs are unavailable, the indices identifying one or more neighboring blocks of each of the one or more blocks of the current MB, at least one of the one or more neighboring blocks of at least one of the one or more blocks located in one of the neighboring MBs; and
select a neighboring block table based on availability of at least one of the plurality of neighboring MBs;
retrieve properties of the identified one or more neighboring blocks from the neighboring block table to decode the current MB and decode the current MB at least in part based on the retrieved properties of the identified one or more neighboring blocks.

12. The article of claim 11, further comprising instructions that if executed enable the system to:
determine if each of the neighboring MBs has the same type as the current MB if all the neighboring MBs are available, availability based on at least one of a location of the current MB relative to a border or what slice the at least one of the one or more neighboring blocks belong to.

13. The article of claim 12 further comprising instructions that if executed enable the system to:
access neighboring block data from a pre-calculated joint table if each of the neighboring MBs has the same type as the current MB, type based on whether the current MB is a frame or field MB.

14. The article of claim 13, further comprising instructions that if executed enable the system to:
access neighboring block data from a pre-calculated individual table if each of the neighboring MBs does not have the same type as the current MB, type based on whether the current MB is a frame or field MB.

15. The apparatus of claim 2, the macroblock module to further determine if the one or more neighboring blocks are the same type as the one or more blocks of the current MB, type comprising at least one of 4×4, 4×8, 8×4, 8×8, 8×6 or 16×8.

16. The system of claim 5, the macroblock module to further determine if the one or more neighboring blocks are the same type as the one or more blocks of the current MB, type comprising at least one of 4×4, 4×8, 8×4, 8×8, 8×16 or 16×8.

17. The method of claim 8, comprising determining if the one or more neighboring blocks are the same type as the one or more blocks of the current MB, type comprising at least one of 4×4, 4×8, 8×4, 8×8, 8×16 or 16×8.

18. The article of claim 12, comprising determining if the one or more neighboring blocks are the same type as the one or more blocks of the current MB, type comprising at least one of 4×4, 4×8, 8×4, 8×8, 8×16 or 16×8.

19. The apparatus of claim 1, the properties comprising at least one of a motion vector or an intra prediction.

20. The system of claim 1, the properties comprising at least one of a motion vector or an intra prediction.

* * * * *

UNITED STATES PATENT AND TRADEMARK OFFICE
CERTIFICATE OF CORRECTION

PATENT NO.        : 8,787,465 B2             Page 1 of 1
APPLICATION NO.   : 11/396102
DATED             : July 22, 2014
INVENTOR(S)       : Yi-Jen Chiu et al.

It is certified that error appears in the above-identified patent and that said Letters Patent is hereby corrected as shown below:

On the Title page and in the Specification, in column 1, line 2, in the second line of the Title, delete "OF" and insert -- FOR --, therefor.

In the Claims

In column 31, line 2, in claim 15, delete "8×6" and insert -- 8×16 --, therefor.

Signed and Sealed this
Fifth Day of May, 2015

Michelle K. Lee
*Director of the United States Patent and Trademark Office*